United States Patent [19]

Northcutt

[11] Patent Number: 5,019,417
[45] Date of Patent: May 28, 1991

[54] PIPE LINING SYSTEM

[76] Inventor: Gerald G. Northcutt, P.O. Box 244, Tehachapi, Calif. 93561

[21] Appl. No.: 393,802

[22] Filed: Aug. 15, 1989

[51] Int. Cl.$^5$ .................... B05D 3/06; B05D 7/22; B05C 11/02; B05C 1/04
[52] U.S. Cl. .................... 427/54.1; 427/53.1; 427/55; 427/230; 427/239; 118/620; 118/641; 118/105; 118/254; 118/DIG. 10
[58] Field of Search .................... 427/53.1, 54.1, 55, 427/44, 45.1, 41, 140, 142, 230, 239; 118/50.1, 620, 641, 105, 254, DIG. 10

[56] References Cited

U.S. PATENT DOCUMENTS

| | | | |
|---|---|---|---|
| 3,079,888 | 3/1963 | McLean | 118/DIG. 10 |
| 3,111,431 | 11/1963 | Weaver | 118/105 |
| 3,122,786 | 3/1964 | Huisman | 18/5 |
| 3,125,464 | 3/1964 | Harmes | 118/105 |
| 3,333,311 | 8/1967 | Matheny et al. | 25/38 |
| 3,885,521 | 5/1975 | von Arx | 118/105 |
| 4,135,958 | 1/1979 | Wood | 156/199 |
| 4,308,824 | 1/1982 | Muta et al. | 118/713 |
| 4,556,580 | 12/1985 | Kamuro et al. | 427/230 |
| 4,687,677 | 8/1987 | Jonasson | 427/54.1 |
| 4,716,053 | 12/1987 | Eskijian | 427/230 |

FOREIGN PATENT DOCUMENTS

| | | | |
|---|---|---|---|
| 0034910 | 8/1985 | Japan | 427/230 |
| 3097272 | 4/1988 | Japan | 427/230 |
| 8204428 | 6/1984 | Netherlands | 427/230 |
| 8804387 | 6/1988 | PCT Int'l Appl. | 427/230 |
| 2167828 | 6/1986 | United Kingdom | 427/230 |

Primary Examiner—Norman Morgenstern
Assistant Examiner—Marianne Padgett
Attorney, Agent, or Firm—Dennison, Meserole, Pollack & Scheiner

[57] ABSTRACT

A system for pipe lining including a forward seal and a following spreader defining a chamber therebetween for receiving flowable lining material. The spreader is immediately followed by a cylindrical elongate platen formed of radiant-energy transparent material. A radiant energy source is mounted in the platen for transmission of radiant energy through the platen and into the lining material simultaneously with the forming of the lining material into position by the platen as the apparatus moves along the interior of the pipe.

10 Claims, 2 Drawing Sheets

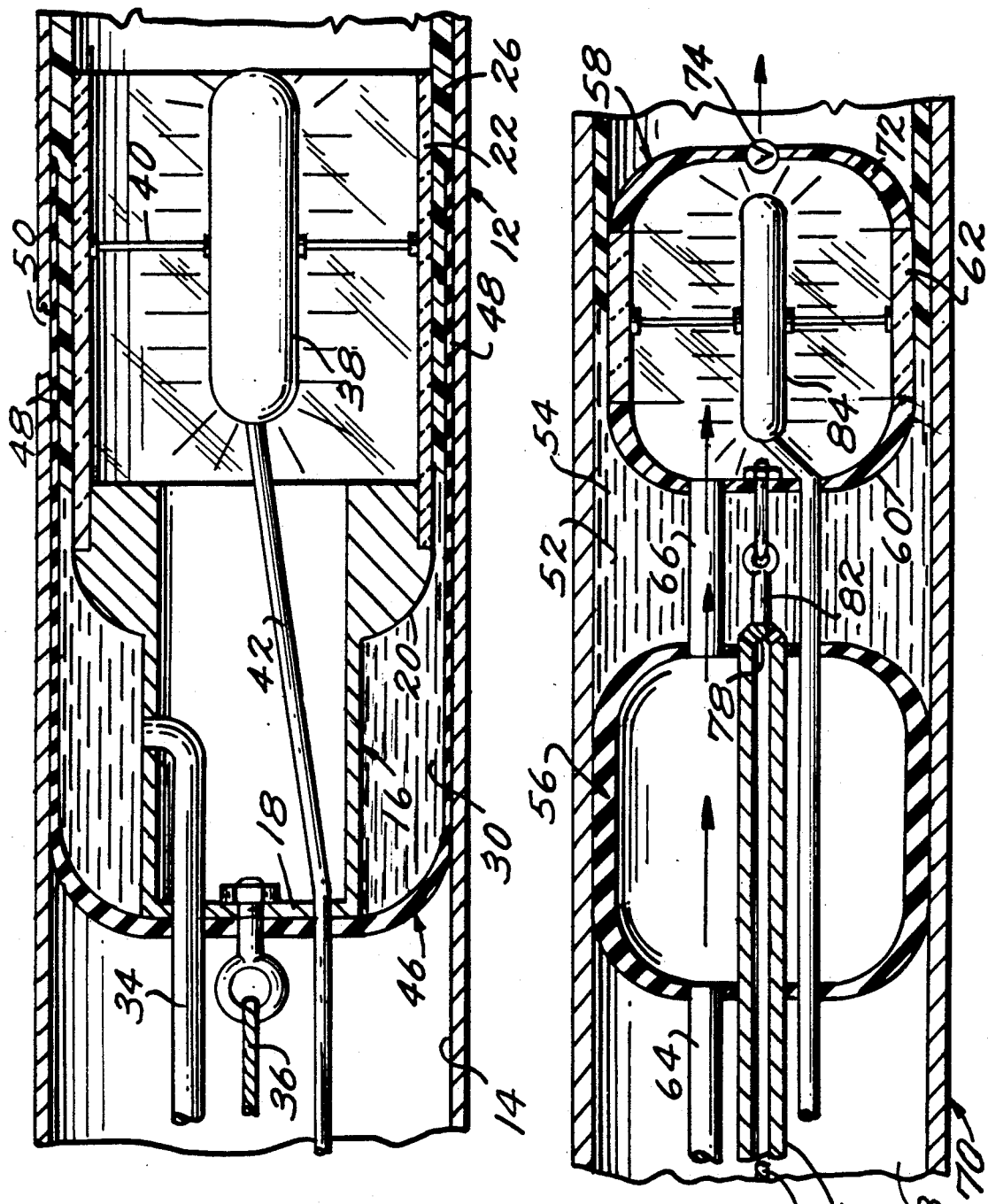

5,019,417

PIPE LINING SYSTEM

BACKGROUND OF THE INVENTION

Pipes or pipelines, because of deterioration from corrosion, abrasion, age, and the like, require periodic repair, normally in the nature of a relining of the interior of the pipe. It is also frequently desirable to seal or protect the interiors of new pipes by the in situ forming of liners therein.

The liner and manner of applying the liner can take various forms including use of a preformed membrane unrolled or inverted along the length of the pipe as noted in U.S. Pat. No. 4,135,958 to Wood. More commonly, the liner will be formed from a flowable liner material spread and cast into position against the interior surface of the pipe. Examples of such systems, wherein the liner material is applied in the manner of a coating, will be noted in the following patents:

| Weaver | 3,111,431 |
| Huisman | 3,122,786 |
| Matheny et al | 3,333,311 |
| von Arx | 3,885,521 |
| Muta et al | 4,308,824 |

While utilizing a flowable lining material has distinct advantages, difficulties are frequently encountered in properly curing the material in a manner whereby the material defines a self-sustaining liner as the distributing apparatus travels forwardly out of direct supporting engagement with the material.

The patent to Wood shows the use of a bank of illumination and radiation sources which cure the resin of the preformed tubular lining material after the liner material has been inverted and engaged with the passageway surface. The bank of illumination and radiation sources travels behind the liner positioning apparatus, traveling on wheels if desired.

SUMMARY OF THE INVENTION

The pipe lining or relining apparatus of the present invention applies a flowable or fluid lining material peripherally about and in intimate engagement with the interior of the pipe as the apparatus travels continuously therealong. Rather than relying on the stability of the spread and placed material to sustain itself until cured, either solely through the inherent nature of the material or by means following the material applying apparatus, the present invention provides means within the liner configuring platen itself for subjecting the lining material to curing or cure accelerating radiant energy simultaneously with the initial forming of the liner whereby an effective cure is achieved prior to passage of the material applying apparatus.

The apparatus basically consists of a leading seal and a spaced following spreader defining a chamber therebetween which receives the flowable lining material. A liner-configuring platen engages and immediately follows the spreader, forming a compartment, normally cylindrical, complementing the interior of the pipe in inwardly spaced relation thereto. The compartment is provided with a radiant-energy transparent wall peripherally thereabout, the wall providing an outer forming surface for the lining material.

Additional details of construction, and advantageous features of the invention will be noted in the following more detailed description of the invention.

BRIEF DESCRIPTION OF THE DRAWINGS

FIG. 2 is a cross-section view similar to FIG. 1 through a related second embodiment of the invention; and FIG. 3 is a cross-sectional view through a further related embodiment.

DESCRIPTION OF PREFERRED EMBODIMENTS

Figure 1:
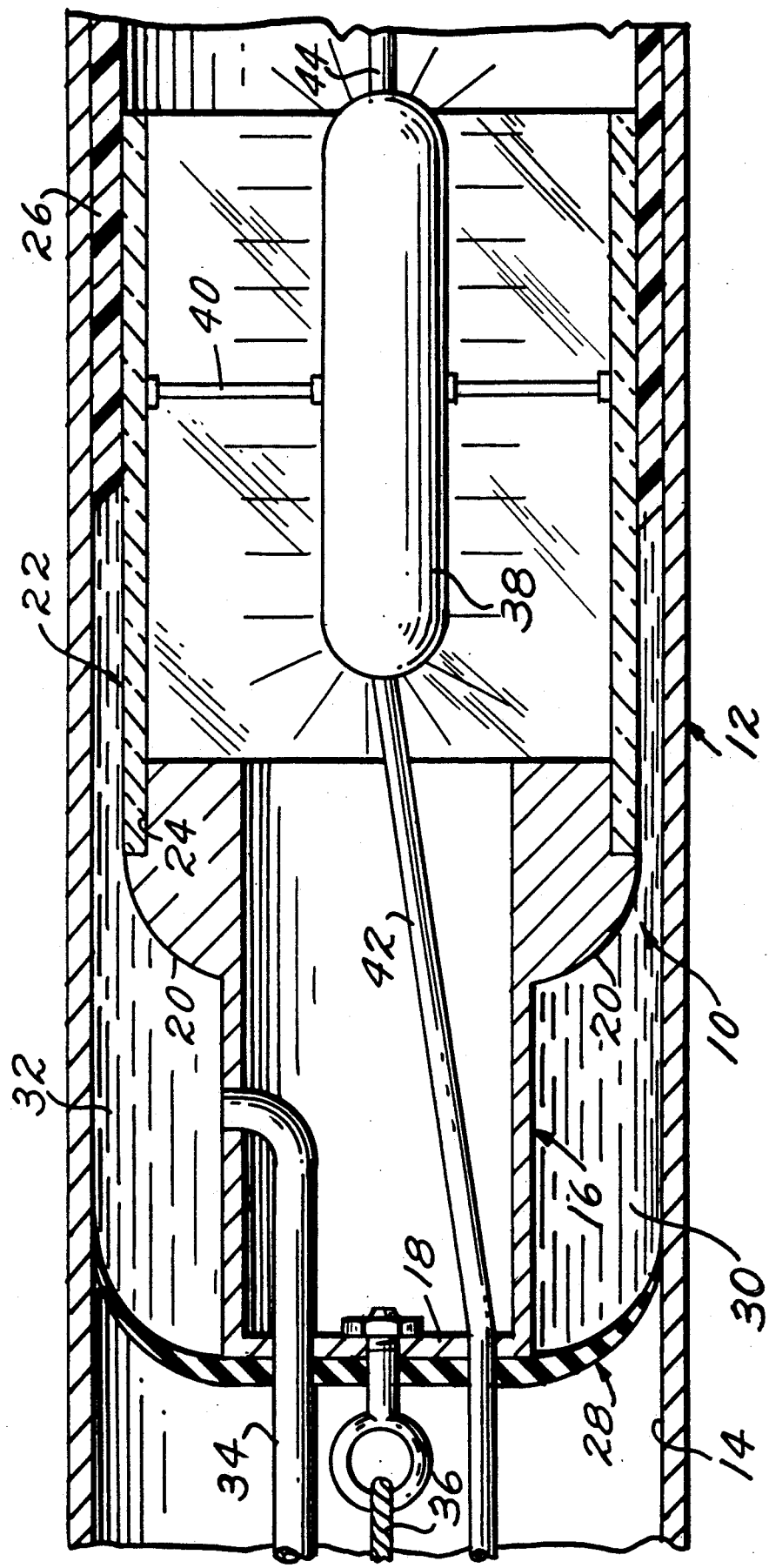
FIG. 1 is a generally schematic cross-sectional view through the pipe lining apparatus of the present invention.

Referring now more specifically to the drawings, FIG. 1 illustrates the pipe lining apparatus 10 in operative position within a pipe 12, the interior surface 14 of which is in the process of being lined.

The apparatus 10 includes a hollow cylindrical body 16 with a forward end wall 18. The body 16, in rearwardly spaced relation to the forward wall 18, further includes an outwardly enlarged annular spreader or spreader portion 20. The spreader 20 is arcuate in cross-section to effect an outward spreading of the lining material as shall be described subsequently. The spreader is immediately followed by a hollow cylindrical platen 22 which defines an integrally joined rearward continuation of the outer rearmost extremity of the spreader 20. As illustrated, the wall of the body 16, immediately rearward of the arcuately inclined spreader 20, may be recessed, as at 24, to accommodate the leading portion of the cylindrical platen 22 whereby the outer surface of the platen 22 provides a smooth continuation of the spreader surface. As will be appreciated from FIG. 1, the diameter of the platen 22 is to be such as to define an annular space between the platen and the surrounding inner surface 14 of the pipe which corresponds to the desired thickness of the liner 26 to be formed.

An enlarged circular seal 28, in the nature of an elastomeric rubber or plastic disc, is mounted on the front face of the forward wall 18 of the body 16 and extends radially beyond the body 16 peripherally thereabout. The diameter of the circular seal 28 is greater than that of the internal diameter of the pipe 12 whereby, upon a forward drawing of the device 10 through the interior of a pipe 12, the peripheral edge portion of the seal 28 will rearwardly flex to define a cupped configuration with the inherent resiliency of the seal maintaining the edge portion in intimate engagement with the inner surface 14 of the pipe 12. As illustrated, the elastomeric circular seal 28 can be progressively thinner toward the outer edge to increase the flexibility thereat and enhance the engagement with the interior surface of the pipe.

The forward seal 28 and following spreader 20 define a chamber 30 therebetween annularly about the body 16 for reception of flowable or fluid lining material 32 under pressure through an appropriate supply means 34. The supply means 34 may be in the nature of one or more supply tubes engaged through the seal 28 and forward end wall 18 into the hollow cylindrical body 16 for lateral discharge through the wall of the body 16, either directly or through a manifold unit (not illustrated), to facilitate a complete filling of the annular chamber 30. The introduction of the flowable lining material 32 under pressure will tend to centrally locate the body 16 within the pipe and exert pressure on the peripheral rearwardly directed portion of the seal 28 to enhance the sealing engagement thereof with the interior of the pipe.

The actual introduction of the flowable material will be effected simultaneously with the forward drawing of the apparatus through the pipe with the cooperative effect of the forward movement and the pressure of the material 32 maintaining the cup-configuration of the seal 28 and the desired intimate sealing engagement with the interior pipe surface 14.

The forward movement of the device 10 can be effected by a pulling cable 36 bolted through the seal 28 to the forward wall 18 of the body 16 and remotely wound on an appropriate winch mechanism (not illustrated).

In order to effect or accelerate the curing of the flowable material 32 a source 38 of radiant energy is mounted directly within the hollow interior of the cylindrical platen 22, positioned therein by any appropriate support means, for example a support spider 40 as schematically illustrated. The radiant energy can be in the nature of ultraviolet, RF or microwave emissions, or can be a heat emission from an electrical heating unit or the like. The particular nature of radiation source 38 will depend, in large measure, on the nature of the lining material itself. The platen 22 will preferably be of a clear rigid plastic or high strength glass for unimpeded transmission of the curing radiant energy therethrough, particularly when utilizing ultraviolet emissions and the like. In those instances wherein the radiation source merely emits heat as the curing or cure accelerating means, the platen 22 can be translucent or even opaque, as long as it remains "radiant-energy transparent."

Energy for the radiation source 38 can be supplied through an elongate conduit or cable 42 engaged through the seal 28 and forward wall 18 of the body 16 Further, While the major curing is effected directly at the platen utilizing the energy source 38 housed therein, auxiliary or supplemental sources (not illustrated) may trail behind the platen 22 as suggested by the connector power cable 44 in FIG. 1.

In use, the apparatus is initially introduced into the pipe 12 to the point at which the lining operation is to commence. The fluid lining material 32 is pumped into the chamber 32 through the conduit or conduits 34 under pressure. This causes the seal 28 to intimately contact the interior surface 14 of the pipe 12 with the continued build-up of fluid pressure causing the flowable lining material to be forced rearwardly between the platen 22 and the pipe surface 14. The spreader 20, immediately forward of the platen, equally distributes the rearwardly forced material 32 peripherally about the platen to define a constant thickness liner 26. As desired, an appropriate peripheral support means may be provided for the platen to ensure coaxial movement of the platen through the pipe.

The entire apparatus may be drawn forwardly through the pipe by means of the cable 36 engaged with a remote winch (not shown). The flowable conduit 34 and power cable 42 are similarly forwardly drawn in a manner which maintains supply to the liner apparatus 10 itself without interference with the forward movement thereof. As the flowable lining material is formed about the traveling platen, the material is directly and simultaneously subjected to curing or cure accelerating radiant energy through the platen itself for enhanced strength and stability prior to forward movement of the platen and removal of the direct support from the formed liner 26.

The embodiment of FIG. 2 is similar to the embodiment of FIG. 1, and like components have been given like reference numerals. The significant difference in the FIG. 2 embodiment is in the forward expandable seal 46. The seal 46, rather than terminating in a slightly rearwardly flexed peripheral edge well forward of the spreader 20, has a trailing edge 48 extending rearwardly beyond the spreader 20 and along a major portion of the length of the platen 22, defining a deep cup configuration. Such an elongate seal is particularly for use within areas of extreme pipe degradation with the seal spanning any open breaks 50 in the pipe until sufficient curing has been achieved to make the liner self-sustaining for retention in position as the apparatus moves forward.

FIG. 3 illustrates a further embodiment wherein the chamber 52, receiving the flowable lining material 54, is defined between a forward inflatable seal 56 and a following inflatable unit 58. The following unit 58 defines both a forwardly directed spreader 60 and a cylindrical platen 62, formed of radiant-energy transparent material immediately therebehind.

Both the leading unit or seal 56 and the following unit 58 are inflated by pressurized air supplied, from an appropriate source (not illustrated), through a main supply conduit 64, preferably flexible to accommodate movement of the device, and a connector conduit 66 between the units themselves.

Upon inflation, the seal 56 expands into slidable sealing engagement with the interior surface 68 of the pipe 70 to preclude forward discharge of the flowable lining material 54.

The inflation of the following unit 58 is controlled by the rigid platen 62 to define a generally cylindrical configuration, with the forwardly directed slightly arcuate spreader 60, of a diameter less than that of the interior diameter of the pipe 70 and sufficient to define the desired liner thickness therebetween. As will be appreciated from the drawing, the unit 58, in addition to the spreader 60, also includes a sealed rear wall 72. The spreader 60 and rear wall 72 comprise elastomeric generally hemispheric portions. The sealed rear wall 72 of the unit 58 will preferably include a thermostatically controlled exhaust valve 74 to control internal air pressure.

The flowable material will be introduced between the seal 56 and the spreader 60 of the unit 58 through appropriate ducting 76 terminating, in the material chamber 52, in an appropriate dispensing nozzle 78. An appropriate winching cable system 80, and linkage 82 between the units, can be provided as required to move the device or apparatus through the pipe during the lining procedure.

As with the prior embodiments, an appropriate radiant energy source is mounted within the platen, with the platen being of an appropriate radiant-energy transparent material so as to effect a curing or cure accelerating of the lining material directly as it is molded into position by the platen 62 and prior to passage of the platen therebeyond.

As with the previous embodiments, the nature of the transparency of the platen 62 will be dictated by the radiant source. For example, and constituting the preferred embodiment, the radiant energy source may provide ultraviolet radiation with the rigid platen being transparent Teflon, a Du Pont trademark for a polytetrafluoroethylene, capable of transmitting approximately 97% of the energy of the radiation.

As will be appreciated, as the various conduits and ducting extend through and into the seal unit and the platen unit, each is appropriately sealed in an airtight manner to avoid leakage either into or out of the units.

In each of the described embodiments, specific provision is made for mounting the radiant energy source directly within and in cooperative relation with the surrounding platen whereby energy enhanced curing or cure acceleration is achieved simultaneously with the formation of the liner by the platen whereby passage of the platen leaves a cured liner requiring no auxiliary or following curing means.

The foregoing is considered illustrative of the principles of the invention. As other embodiments and modifications may occur to those skilled in the art, it is not desired to limit the scope of the invention to the exact construction shown and described. Rather, applicant's unique system and/or method of pipe lining or relining is to be limited only by the scope of the claims following hereinafter.

I claim:

1. A method of lining a pipe utilizing a pipe-received forwardly traveling apparatus comprising a forward seal and a following cylindrical platen defining a chamber therebetween, the method including the steps of:

forming the platen of a radiant energy transparent material and with an internal source of radiant energy;

introducing a flowable liner-forming material into said chamber;

distributing the flowable material in an annular space about and along said cylindrical platen between said platen and the pipe to define a constant thickness liner, and supporting said material in said space by said platen as the apparatus travels forward to form the liner in intimate contact with the pipe; and subjecting the liner material to radiant energy through said platen, as said material is supported by said platen, for curing or accelerating the curing of the liner material.

2. The method of claim 1 including the step of defining said radiant energy by ultraviolet radiation.

3. The method of claim 1 including the step of providing a support for the liner material in outwardly spaced surrounding relation to said platen until said liner material is sufficiently cured to be self-sustaining.

4. Apparatus for lining a pipe with flowable lining material cured in situ, said apparatus being adapted for forward travel through a pipe during the lining thereof, and comprising a leading seal and a following spreader, said seal and said spreader being longitudinally spaced from each other and defining a chamber therebetween for receiving flowable lining material therein, cylindrical platen means immediately following said spreader, said platen means having a diameter such as to define, relative to a surrounding pipe, an annular space between the platen and surrounding pipe for forming spread lining material into intimate lining engagement with the surrounding pipe and supporting said formed lining material, and means for emitting radiant energy for curing or accelerating the curing of the lining material within the annular space as the spread lining material is formed into lining engagement with the pipe and as the material is supported by said platen, said means for emitting radiant energy being contained within said platen means for forward travel therewith, said platen means being formed of radiant-energy transparent material.

5. The apparatus of claim 4 wherein said means for emitting radiant energy comprises an ultraviolet source for ultraviolet emission, said platen being of a clear rigid material.

6. The apparatus of claim 5 wherein the platen is formed of a polytetrafluoroethylene.

7. The apparatus or claim 4 wherein said seal includes a trailing flexible circumferential edge portion engagable with a surrounding pipe upon the introduction of the flowable lining material.

8. The apparatus of claim 4 wherein said seal is an inflatable unit adapted for air-inflation into sealing engagement with a pipe.

9. The apparatus of claim 8 including forward and rear generally hemispherical elastomeric components sealed to said cylindrical platen means and defining a second inflatable unit therewith, said platen being rigid and retaining said second inflatable unit in a generally cylindrical configuration, said forward component defining said spreader, and means for introducing pressurized air into both inflatable units, said means for emitting radiant energy being completely contained within said second unit.

10. Apparatus for lining a pipe with flowable lining material cured in situ, said apparatus being adapted for forward travel through a pipe during the lining thereof, and comprising a leading seal and a following spreader, said seal and said spreader being longitudinally spaced from each other and defining a chamber therebetween for receiving flowable lining material therein, platen means immediately following said spreader for forming spread lining material into intimate lining engagement with a surrounding pipe, and means for emitting radiant energy for curing or accelerating the curing of the lining material, said means for emitting radiant energy being contained within said platen means for forward travel therewith, said platen means being formed of radiant-energy transparent material, said seal includes a trailing flexible circumferential edge portion engagable with a surrounding pipe upon the introduction of the flowable lining material, said trailing peripheral edge portion of said seal extending rearwardly from said seal about said chamber and spreader, and at least partially about said platen means in outwardly spaced relation thereto for the confining of the flowable material therebetween for enhanced stability of the lining material.

* * * * *